April 1, 1952 V. H. SPRINGFORD 2,591,311
KITCHEN PRESS
Filed May 22, 1948 2 SHEETS—SHEET 1
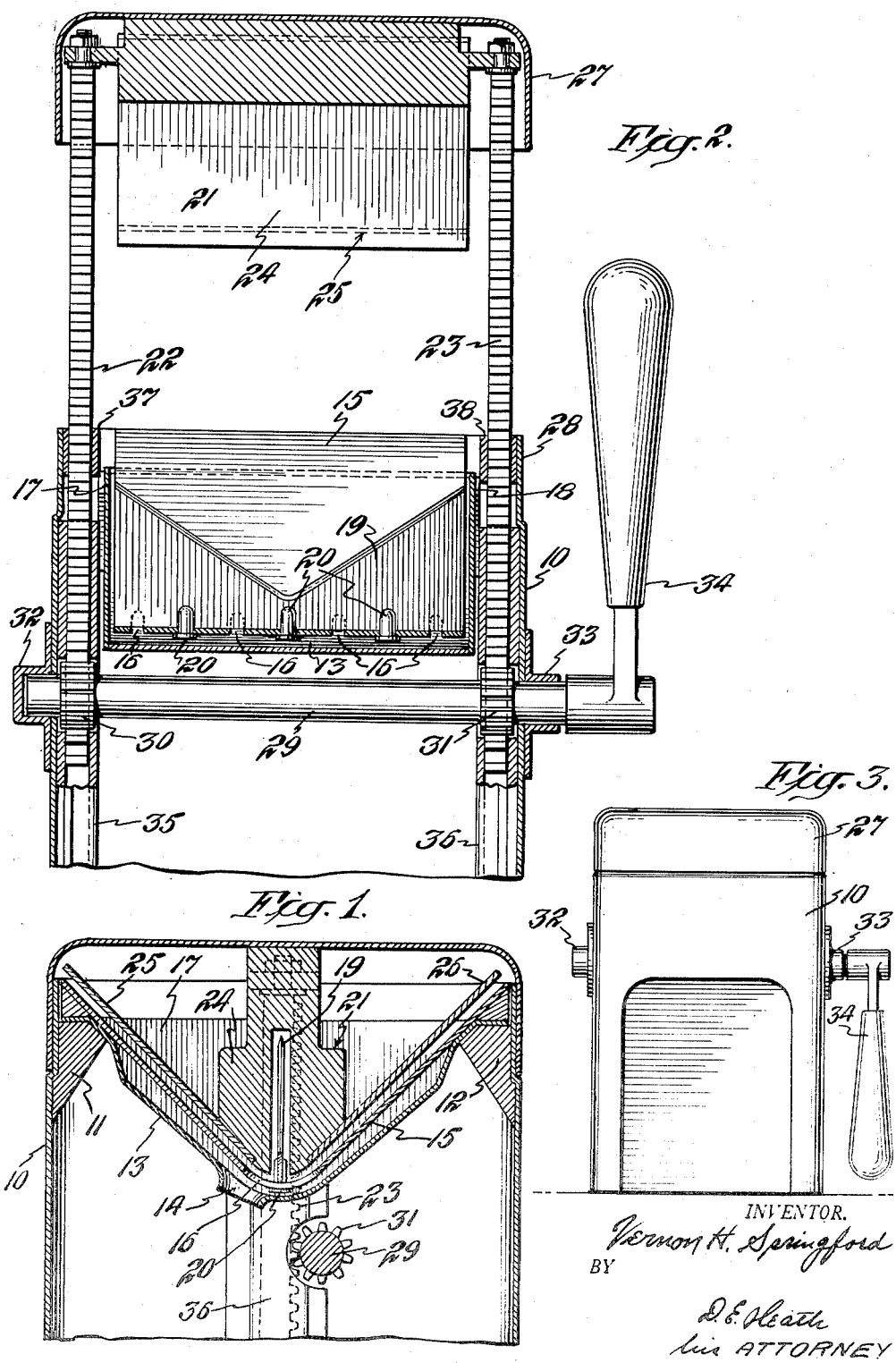
INVENTOR.
Vernon H. Springford
BY
D. E. Heath
his ATTORNEY April 1, 1952  V. H. SPRINGFORD  2,591,311
KITCHEN PRESS
Filed May 22, 1948  2 SHEETS—SHEET 2
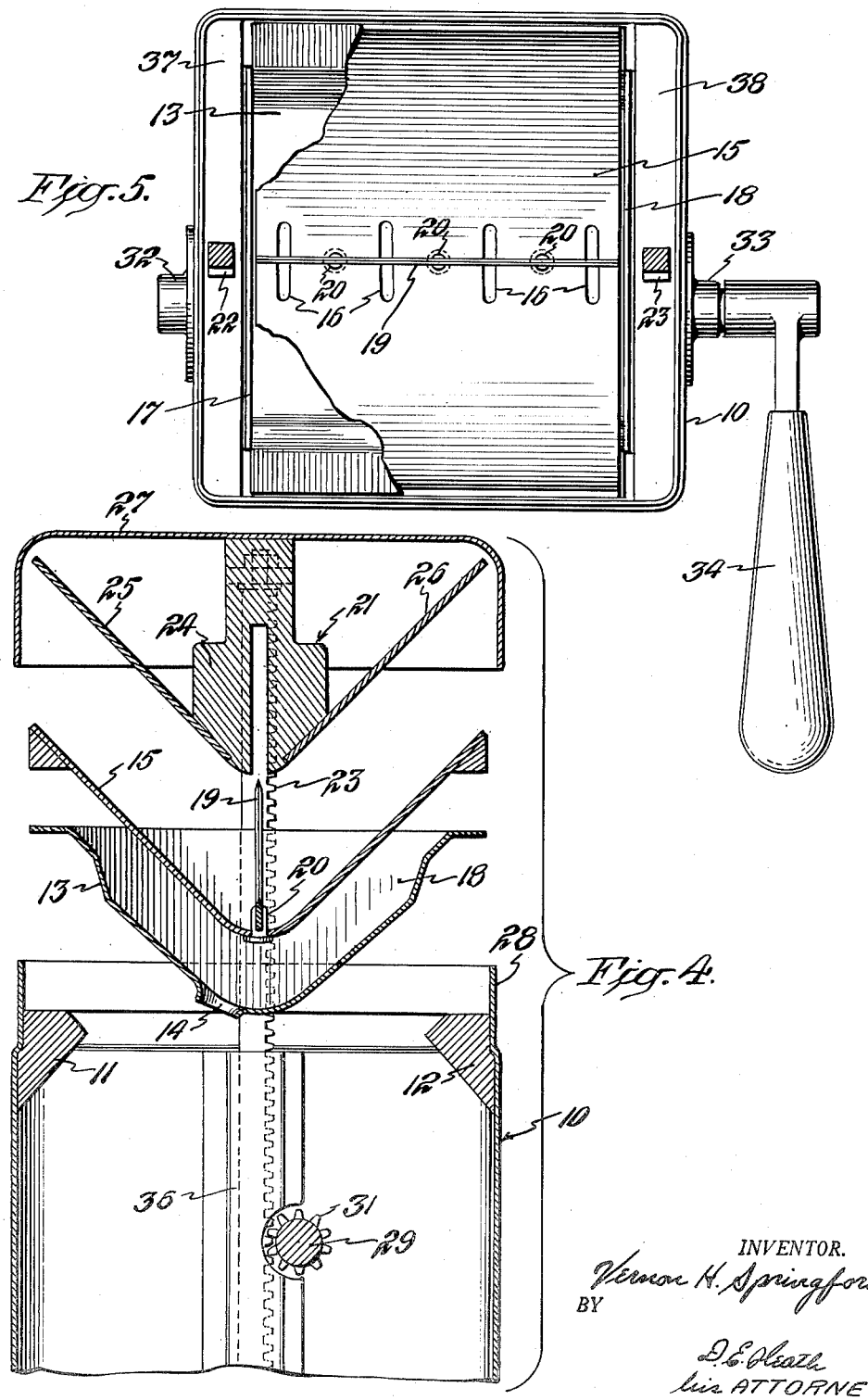
INVENTOR.
Vernon H. Springford
BY
D. E. Heath
his ATTORNEY Patented Apr. 1, 1952

2,591,311

UNITED STATES PATENT OFFICE 2,591,311

KITCHEN PRESS

Vernon H. Springford, Evansville, Ind., assignor of one-third to Sherman B. Daugherty, Evansville, Ind.

Application May 22, 1948, Serial No. 28,643

1 Claim. (Cl. 100—42)

My invention relates to a kitchen press and more particularly to such a device for expressing juice from whole fruit.

It would seem a simple matter to merely place a whole fruit in a press and exert pressure to compress the fruit to force out its juice. But in the case of skin jacketed fruits, such as the citrus fruits, the pressure required is too great and oil expressed from the skin makes the juice bitter. The skin has to be ruptured to obtain the juice from within, and the usual spherical shape of the skin or jacket, plus its resiliency, plus the internal support of the pulp cells provides great resistance to rupture by a press operation alone. It is for this reason the usual juice extractor requires a separate preliminary cutting operation. Devices incorporating the cutting or skin rupturing operation in the press have been unsatisfactory in that they require locking and unlocking of a cover, or require positioning of the fruit in the press, as by impaling on a spike or piercing projection; do not afford drainage for the juice; require a large operating force or a long press travel; or excessively crush the jacket which contributes a bitter taste to the juice.

If a press is arranged to completely sever a fruit before starting the pressing action, a long travel is required—about twice the diameter of the fruit. It is therefore preferable to start the cutting action and continue it as the pressing action occurs. I have found that for success with this combination action there must be created an outward spreading of the skin or jacket at the cut. The skin must not block drainage of juice from the press. Oil should not be expressed from the skin. Any fruit from a small lime to a large grapefruit is simply dropped in my press and the handle easily operated while the juice drains freely, and a cover or lid closes the press automatically. The objective is attained by a novel structure involving a new formation and relationship of parts, as described below in connection with the accompanying drawings in which:

Fig. 1 is a vertical section in closed position of a kitchen press embodying my invention;

Fig. 2 is a section in open position of the press and normal to the plane of Fig. 1;

Fig. 3 is a front elevation of the press in closed position;

Fig. 4 is a section like Fig. 1 but in open position of the press with parts in exploded view; and Fig. 5 is top plan view of the press bed partly cut away to show the drain trough.

A casing 10 provides the body of the press and is in the form of a generally square tube standing on end. Two ledges 11 and 12 are formed by securing two bars on opposite interior walls near the upper end of the casing 10. The ledges 11 and 12 support a generally V-shape drain trough 13 having a drain spout 14. A bed plate 15 is V-shaped and also is supported by the ledges 11 and 12. In the bottom of the press bed 15 there is a series of drain slots 16.

It is important that the lower edges, at least, of the press bed 15 are spaced from the plates 17 and 18 that form the closed ends of the drain trough 13. Should the slots 16 become stopped by the fruit skin in the press operation, the expressed juice drains laterally over the ends of the press bed into the trough.

A cutting blade 19 is located in the bottom of the bed plate 15. The blade stands upright in the apex of the V-shape bed and is the same length as the bed. The cutting edge is upward and is V-shape. The blade 19 is suitably secured in place as by fasteners 20.

The cutting blade 19 bisects the angle of the V-shape press bed 15, so the edges of the V-blade converge downward in a plane perpendicular to the median sectional plane of the V-shape bed plate. The downward convergent walls of the bed plate 15 and the edges of the blade 19 form a pocket into which descends any fruit tossed into the press. The apex of the blade 19 is near the apex of the press bed 15, so the fruit of any size locates itself centrally in the press and on the knife.

A press head 21 is V-shape and movably suspended above the bed 15 by two rack toothed bars 22 and 23. The head comprises a central body portion 24 to which are secured two wing plates 25 and 26.

A cover or lid 27 is secured on top of the press head 21. When the press head 21 is raised, the lid 27 is also raised, as seen in Figs. 2 and 4. When the press head 21 is lowered to a point adjacent the press bed 15, the lid 27 encompasses the upper part of the casing 10, providing a cover which closes the top of the press. The closed position of the press is illustrated in Figs. 1 and 3. The upper part of the casing 10 has a reduced section 28 at its upper edge to receive the lid 27 and afford a smooth exterior when the press is closed.

A shaft 29 on which are secured two pinions 30 and 31 is journaled in opposite side walls of the casing 10 by bearing plates 32 and 33. One end of the shaft 29 projects through the bearing plate 33 and is provided with a suitable handle 34. The pinions 30 and 31 respectively engage the rack toothed bars 22 and 23 which are located in vertical guides 35 and 36. As seen in Figs. 2 and 5, the spaces at the ends of the press occupied by the rack bars are finished at the top by ledges 37 and 38 which have center openings through which the rack bars 22 and 23 project.

As seen in Fig. 3, the casing 10 may be provided with a side opening through which any suitable receptacle can be inserted below the drain spout 14. The latter could of course be lengthened and projected outside of the casing 10.

When the press is closed it presents an external appearance about as shown in Fig. 3. The cap 27 is closed on the upper end of the casing 10 giving a neat, smooth appearance. Turning the handle 34 raises the cap 27 and the press head 21 by the rack and pinion mechanism. A whole fruit such as, for instance, an orange is tossed into the press where it locates itself in the pocket formed by the V-shape blade 19 and the V-shape press bed 15. The orange rests upon the cutting edge of the blade 19. Reversing the operation of the handle 34, the press head 21 and cover 27 descend. The press head 21 engages the orange and forces it downward on the blade 19 causing the skin to be cut by the blade. The cutting edges of the blade 19 are at an angle to the direction of thrust on the orange so that the cutting operation is performed with minimum effort. Simultaneously with the cutting operation, or soon after the beginning of the cutting operation, depending upon the size of the fruit, the halves of the orange are pressed between the bed 15 and the head 21 causing the skin to gap at the cut and the pulp within to be compressed so that the juice is extracted. The juice flows through the slots 16 and also over the ends of the bed plate 15 into the trough 13 and thence through the drain spout 14 into a receptacle located beneath it. The press head 21 is slotted to receive the blade 19 as the press is closed. When the press is open the head 21 is freely accessible for cleaning, and the bed plate 15 and trough 13 can be lifted out for cleaning as indicated in Fig. 4.

Various changes and modifications may be made within the scope of this invention which is set forth in the following claim:

I claim:

In a kitchen press, a receptacle open at the top and having a drain opening, a press bed substantially in the form of a V-shape trough and located in said receptacle, a cutting blade with a substantially V-shape cutting edge within the press bed and in a plane bisecting the angle thereof, the apex of the cutting edge being near the apex of the press bed, and a substantially V-shape press head movable into and out of the press bed and slotted to straddle the blade, the ends of said trough being open and spaced from the side walls of said receptacle to permit lateral flow of liquid over the press bed into the receptacle.

VERNON H. SPRINGFORD.

REFERENCES CITED

The following references are of record in the file of this patent:

UNITED STATES PATENTS

| Number | Name | Date |
| --- | --- | --- |
| D. 144,481 | Casanov | Apr. 23, 1946 |
| 226,166 | Fanning | Apr. 6, 1880 |
| 434,327 | Dunlap | Aug. 12, 1890 |
| 493,720 | Heslop | Mar. 21, 1893 |
| 572,849 | White | Dec. 8, 1896 |
| 587,860 | Redmon | Aug. 10, 1897 |
| 609,695 | McKee | Aug. 23, 1898 |
| 1,938,463 | Roberts | Dec. 5, 1933 |
| 2,067,555 | Walker | Jan. 12, 1937 |
| 2,142,975 | Majewski | Jan. 3, 1939 |
| 2,318,784 | Koch | May 11, 1943 |
| 2,474,399 | Johnson | June 28, 1949 |
| 2,526,258 | Mitnick | Oct. 17, 1950 |